Figure 1:
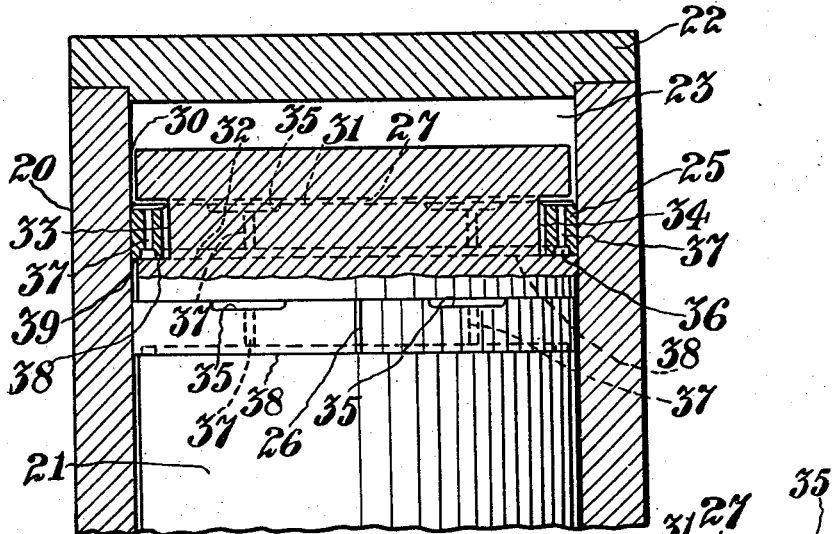

Sept. 1, 1936.    R. MILLER    2,052,642
PISTON RING
Filed Aug. 15, 1935

INVENTOR
Ralph Miller.
BY
Chester A. Adee
HIS ATTORNEY.

Patented Sept. 1, 1936

2,052,642

UNITED STATES PATENT OFFICE 2,052,642

PISTON RING

Ralph Miller, Easton, Pa., assignor to Ingersoll-Rand Company, Jersey City, N. J., a corporation of New Jersey Application August 15, 1935, Serial No. 36,250

3 Claims. (Cl. 309—31)

This invention relates to packing devices, and more particularly to a piston ring of the resilient metallic type.

The present invention is particularly adapted for use on pistons of high speed engines in which the rate of pressure rise is extremely rapid, so that, unless suitable provisions are made to assure reasonably free movement of the piston ring in its groove, the prevailing pressure acting on one side of the ring presses the other side of the ring against the adjacent wall of the ring groove with such force as to prevent movement of the ring in the groove. Thus, in engines in which the piston or the cylinder, or both, are worn to a considerable degree, so that during its movement the piston is capable of tilting relatively to the cylinder, one side of the piston ring may lie entirely in the ring groove. If then the prevailing pressure maintains the ring in that position a portion of the outer surface of the ring may remain out of contact with the cylinder wall and "blow-by" will take place. This condition not only results in a loss of power but operates to remove the oil film on the cylinder wall and the piston and is, therefore, the cause of further wear on these parts.

It is accordingly contemplated to minimize frictional contact between the piston and the piston ring so that the entire periphery of the piston ring may constantly remain in contact with the wall of the cylinder wherein the piston operates.

It is a further object to subject certain surfaces or portions of such surfaces of the piston ring simultaneously to pressure of the same value and utilize only as much area of effective contact between the piston ring and the piston as is necessary to prevent leakage through the ring groove.

Other objects will be in part obvious and in part pointed out hereinafter.

Figure 3:
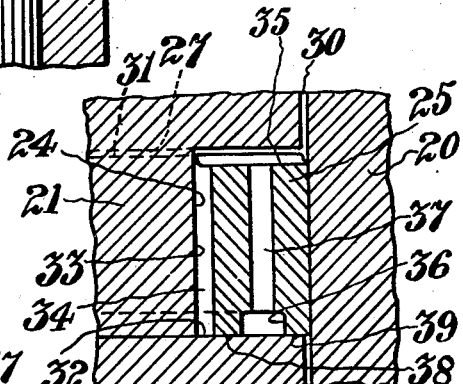
Figure 2:
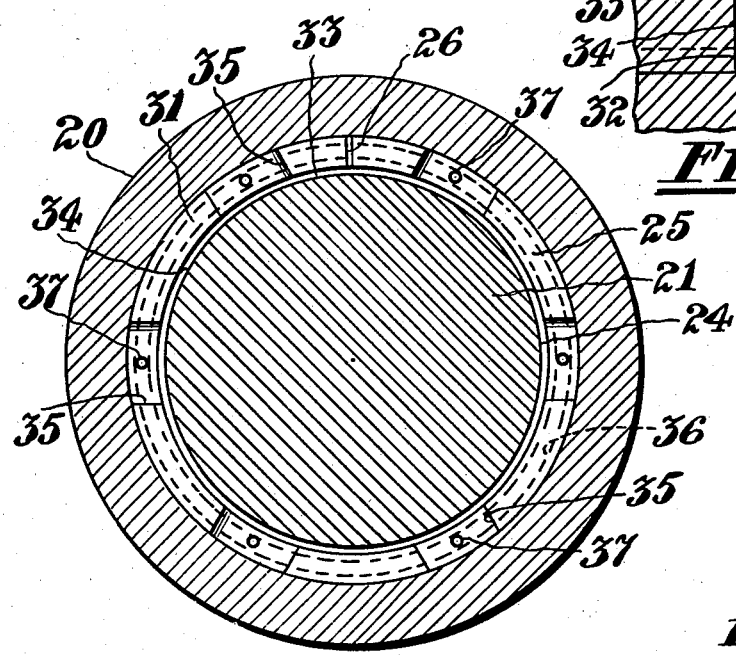

In the drawing accompanying this specification and forming a part thereof,

Figure 1 is an elevation, partly broken away, of a portion of an engine cylinder and a piston, the latter being equipped with a piston ring constructed in accordance with the practice of the invention, Figure 2 is a transverse view through Figure 1 on the line 2—2, and Figure 3 is an enlarged view of a section of the piston ring.

Referring more particularly to the drawing, 20 designates a cylinder, as for instance that of an internal combustion engine, and 21 a piston reciprocable therein. A head 22 seated on the end of the cylinder 20, and which may be secured thereto in any suitable manner, cooperates with the piston 21 and the cylinder to define a combustion chamber 23.

The piston 21 is provided adjacent its end with an annular groove or grooves 24 for the reception of piston rings 25 which cooperate, in the usual manner, with the wall of the cylinder 20 to prevent leakage of pressure from the combustion chamber 23.

The piston ring 25, constructed in accordance with the practice of the invention, consists of a resilient metallic member which is split transversely, as at 26, to permit of free contractile and expansible movement of the ring.

As is well known, portions of rings of the type to which the present invention pertains are subjected directly to the pressure prevailing in the combustion chamber. In structures in which the ring has a close sliding fit in the groove such pressure as may find entrance into the ring is wire-drawn and, hence such a weak force that, in conjunction with the inherent resiliency of the piston ring, it is unable to overcome the pressure gradient acting on the outer surface of the ring. In consequence of this condition the ring remains contracted and pressure leaks from the combustion chamber along the wall of the cylinder. In order to avoid this objectionable occurrence the piston ring 25 of which the entire periphery constitutes a sealing surface is constructed of less width than the groove 24 to provide a clearance 27 above the ring 25. The clearance 27 will thus be in direct communication with the combustion chamber through the clearance existing between the periphery of the piston 21 and the wall of the cylinder 20, and designated 30, and the entire upper surface of the piston ring 25 will constitute a pressure area 31 against which prevailing pressure constantly acts to press the opposite side of the piston ring against the lower surface 32 of the groove.

The groove 24, as is customary, is of greater depth than the distance between the periphery and the inner surface of the ring so that in the event of relative lateral movement between the piston and the ring the interior surface of the ring will not abut the adjacent surface 33 of the groove. A space 34 will thereby exist between the inner surface of the ring 25 and the surface 33 and, in order to permit the free transmission of prevailing pressure into said space, the upper side or surface constituting the pressure area 31 is provided with a series of channels 35 which extend from the periphery to the inner surface of the ring. From the foregoing it will be seen that such pressure as may pass through the clearance 30 will act over the entire pressure area 31 and will also have free access into the space 34 through the channels 35.

In order to render a portion of the pressure acting against the pressure area 31 non-effective and thereby reduce frictional engagement between the ring and the surface 32 to a value which will be sufficient to maintain a seal between the ring and the piston without, however, being of such degree as to cause undue wear on the cooperating surfaces, the piston ring is provided at its lower side with an annular groove 36 intermediate the periphery and the inner surface of the ring. The groove 36 is connected with a zone of prevailing pressure, as for instance the channels 35, by pasages 37 in the ring.

The portion of the lower surface of the piston ring including the groove and the area between the groove and the inner surface of the ring thus serves as a pressure area 38 which will be subjected to pressure of the same value as that existing in the groove 36 and the space 34. The corresponding portion on the opposite side of the ring will, therefore, be balanced. The pressure serving to maintain the ring in sealing engagement with the surface 32 of the groove will be the difference between the pressure gradient acting against a portion 39 on the lower side of the ring, and lying exteriorly of the groove 36, and the prevailing pressure acting against a corresponding portion on the upper side of the ring.

In practice, the present invention has been found to be highly efficient for effecting a seal between the piston and the cylinder. By providing free communication between prevailing pressure and the inner surface of the ring prevailing pressure may be transmitted into the ring freely and thus may constantly augment the resiliency of the ring to overcome the pressure gradient on the periphery of the ring. The ring will, therefore, remain in constant contact with the wall of the cylinder and prevent loss of pressure at that point. A further highly desirable advantage of the present invention is, that by partly balancing the pressure acting against the side of the ring adjacent the source of pressure only as much of the prevailing pressure acting against the surface 31 as is required to maintain an adequate seal between the ring and the surface 32 of the groove will be effective for this purpose. The piston and the ring may, therefore, move freely laterally with respect to each other and with a minimum degree of friction so that the cooperating surfaces relied upon to maintain a seal between the piston and the ring will be subjected to only a minimum of wear.

I claim:

1. A piston ring of which one entire side constitutes a pressure area adapted to be exposed to prevailing pressure when in use and having channels in such side to convey prevailing pressure to the interior of the ring, there being an annular groove in the opposite side of the ring intermediate the periphery and the inner surface of the ring, said ring having passages intermediate its inner and outer surfaces to afford communication between the channels and the groove.

2. A piston ring having a series of channels extending entirely across one side surface and an annular groove in the other side surface, there being passages in the ring to afford communication between each channel and the groove, and a peripheral sealing surface extending from one side to the other of the ring.

3. A piston ring having a channel extending entirely across one side surface and a groove in the other side surface intermediate the inner and outer surfaces of the ring, said ring having a passage to afford communication between the channel and the groove, and a peripheral sealing surface extending from one side to the other of the ring.

RALPH MILLER.